(12) United States Patent
Grosbach et al.

(10) Patent No.: US 7,660,251 B2
(45) Date of Patent: Feb. 9, 2010

(54) METHOD AND APPARATUS FOR HIERARCHIAL SCHEDULING OF VIRTUAL PATHS WITH UNDERUTILIZED BANDWIDTH

(75) Inventors: Lyle Edwin Grosbach, Rochester, MN (US); Glen Howard Handlogten, Rochester, MN (US); James Francis Mikos, Rochester, MN (US); David Alan Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 12/044,994

(22) Filed: Mar. 9, 2008

(65) Prior Publication Data

US 2008/0159297 A1    Jul. 3, 2008

Related U.S. Application Data

(63) Continuation of application No. 10/317,413, filed on Dec. 12, 2002, now Pat. No. 7,362,706.

(51) Int. Cl.
*H04L 12/26* (2006.01)
(52) U.S. Cl. .................. 370/230.1; 370/235; 370/230
(58) Field of Classification Search .............. 370/230.1, 370/235, 230
See application file for complete search history.

(56) References Cited

U.S. PATENT DOCUMENTS

| 6,272,109 | B1 | 8/2001 | Pei et al. |
| 6,359,861 | B1 | 3/2002 | Sui et al. |
| 6,519,595 | B1 | 2/2003 | Rose |
| 6,621,791 | B1 | 9/2003 | Davie |
| 7,072,344 | B2 * | 7/2006 | Abdelilah et al. ...... 370/395.21 |
| 2002/0107857 | A1 | 8/2002 | Teraslinna |
| 2004/0081167 | A1 | 4/2004 | Hassan-Ali et al. |
| 2004/0160961 | A1 * | 8/2004 | Duckering et al. ....... 370/395.4 |

* cited by examiner

*Primary Examiner*—Jason E Mattis
(74) *Attorney, Agent, or Firm*—Joan Pennington

(57) ABSTRACT

A method and apparatus are provided for implementing hierarchical scheduling of oversubscribed virtual paths with underutilized bandwidth that works for both ATM (cell) and IP (frame) scheduling. A scheduler includes a first calendar for pipes and autonomous flows and a second calendar for pipe flows. A winner of a pipe or an autonomous flow is identified from the first calendar. Responsive to an identified winner pipe, a pipe queue is checked for an associated pipe flow for the winner pipe. Responsive to identifying an empty pipe queue for the winner pipe, a pipe win credit is assigned to the pipe without reattaching the winner pipe to the first calendar. Then a next winner is identified from the first calendar. When a winner pipe flow is identified from the second calendar and the pipe win credit is assigned to the pipe for the winner pipe flow, then the winner pipe flow is serviced without delay.

7 Claims, 8 Drawing Sheets

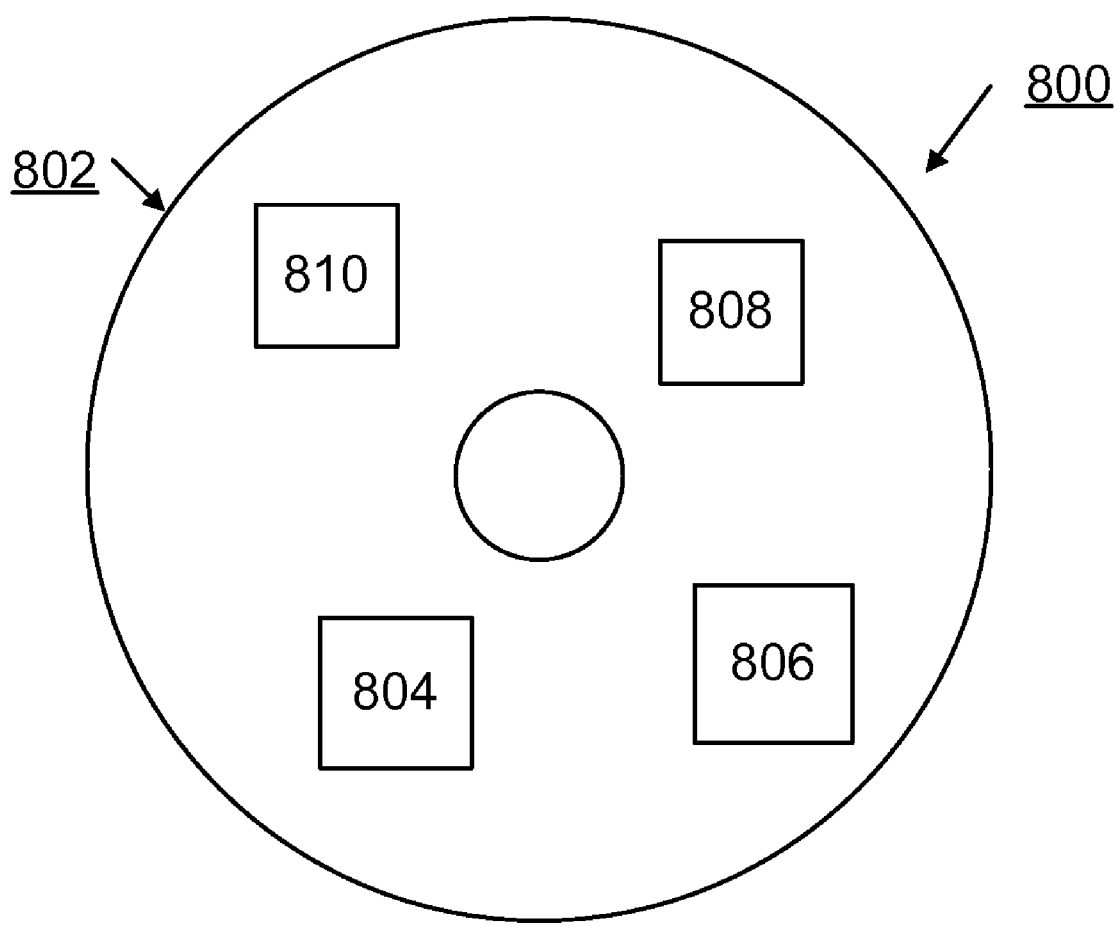

METHOD AND APPARATUS FOR HIERARCHIAL SCHEDULING OF VIRTUAL PATHS WITH UNDERUTILIZED BANDWIDTH

This application is a continuation application of Ser. No. 10/317,413 filed on Dec. 12, 2002.

FIELD OF THE INVENTION

The present invention relates generally to the data processing field, and more particularly, relates to a method and apparatus for implementing hierarchical scheduling of virtual paths.

DESCRIPTION OF THE RELATED ART

Hierarchical scheduling involves the scheduling of one or more flows or virtual channels (VCs) within the bandwidth constraints of a single pipe or virtual path (VP). In general, a hierarchical scheduling design will handle many pipes, each containing many flows. Each pipe and each flow will be configured by the user with a particular set of bandwidth constraints, such as peak and average bandwidth. The flows associated with a pipe will consume their configured bandwidth up to the limit allowed by the pipe. If the aggregate bandwidth of the flows exceeds that which is allowed by the pipe, the aggregate bandwidth of the flows will be limited to the pipe bandwidth using some algorithm.

Conceptually, each system customer is allocated a pipe with an agreed to bandwidth via a user subscription. Typically, due to non-uniform traffic patterns, the pipes are oversubscribed relative to what the overall system can support. For example, if the system can support a bandwidth of x, customers are sold a bandwidth of 5x, with the realization that the peak bandwidth will rarely exceed x. Over-subscription causes unique problems for hierarchical scheduling. If the pipes are not completely empty, they must remain active. Continuing with this example, 5x pipes could be sold knowing that over time they will average 20% or less capacity. Since the pipes are rarely completely empty, and since bandwidth demands can increase to full capacity rapidly, it should be assumed that most or all of the 5x pipes can be active at any given time. Since each pipe is allowed to send its full capacity, it must be serviced accordingly, that is the pipe must be serviced assuming it is running at 100% of its capacity. However, the pipes typically would be found not ready to send anything at least 80% of the time. Since the bandwidth of the pipes adds up to five times the real capacity, this is a problem.

In Asynchronous Transfer Mode (ATM) it is important that no scheduling opportunity be missed. Missed cell opportunities cannot be recovered. When an active pipe is found empty, no cell for that pipe can be sent. In the above example, 80% of the time a pipe will be found empty.

To enable over-subscription, the pipe should only consume scheduler bandwidth when associated flows require servicing. For schedulers implementing true hierarchical scheduling, this is a problem because pipes and flows conventionally use independent scheduling mechanisms. This results in an underutilized pipe consuming as much bandwidth as a fully utilized pipe.

The normal treatment of pipes and flows with pipe bandwidth fully utilized is to provide separate schedulers for pipes and flows. When a flow is selected for servicing, the flow identifier is placed in a pipe queue where it waits for the pipe to be selected for servicing. In this way, aggregate low bandwidth is limited by the pipe bandwidth. That is, many flows can be selected and queued, waiting for the queue to be serviced by the pipe selection.

In the underutilized case, the pipe will be selected more often than the flows. So, at times the pipe queue will be empty. For example, if a pipe contains 10 flows, and each flow has $\frac{1}{10}$ the pipe bandwidth, and there is only 1 active flow, then $\frac{9}{10}$ times the pipe is serviced the pipe queue will be empty and no useful work will be done. Ideally, the system can handle cases like this and support line rate. One alternative is to have a scheduler that operates much faster than is required, so it can hide the unproductive pipe selections, but this is expensive in terms of cycle time and area.

SUMMARY OF THE INVENTION

A principal object of the present invention is to provide a method and apparatus for implementing hierarchical scheduling of virtual paths with underutilized bandwidth. Other important objects of the present invention are to provide such method and apparatus for implementing hierarchical scheduling of virtual paths with underutilized bandwidth substantially without negative effect and that overcome many of the disadvantages of prior art arrangements.

In brief, a method and apparatus are provided for implementing hierarchical scheduling of virtual paths with underutilized bandwidth. A scheduler includes a first calendar for pipes and autonomous flows and a second calendar for pipe flows of respective pipes. A pipe or an autonomous flow is identified as a winner from the first calendar. Responsive to an identified winner pipe, a pipe queue is checked for an associated pipe flow for the winner pipe. Responsive to identifying an empty pipe queue for the winner pipe, without reattaching the winner pipe to the first calendar a pipe win credit is assigned to the pipe. Then a next winner is identified from the first calendar.

BRIEF DESCRIPTION OF THE DRAWINGS

The present invention together with the above and other objects and advantages may best be understood from the following detailed description of the preferred embodiments of the invention illustrated in the drawings, wherein:

FIG. 8 is a block diagram illustrating a computer program product in accordance with the preferred embodiment.

DETAILED DESCRIPTION OF THE PREFERRED EMBODIMENTS

Figure 1:
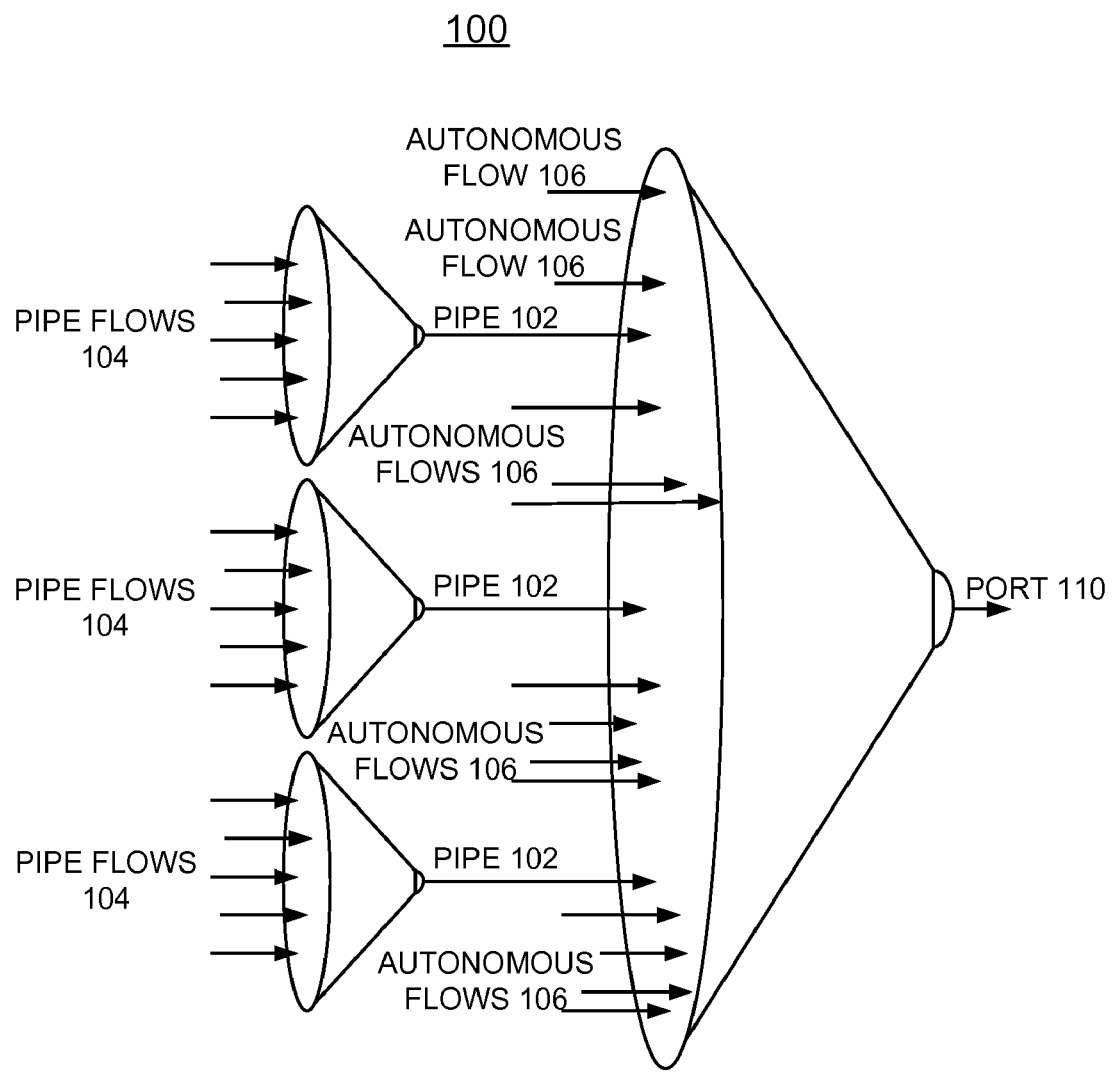
FIG. 1 is a block diagram representation of network traffic in a communications network system in accordance with the preferred embodiment.

Having reference now to the drawings, in FIG. 1, there is shown a communications network system generally designated by the reference character 100 in which the method of the preferred embodiment may be employed for implementing hierarchical scheduling of virtual paths with underutilized bandwidth. Communications network system 100 includes a plurality of pipes or virtual path (VPs) 102, each including one or more pipe flows 104 and a plurality of an autonomous flows 106 sharing a port 110. Each pipe 102 and each member pipe flow 104 are configured with a particular set of bandwidth constraints, such as peak and average bandwidth. Each of the member pipe flows 104 within a respective pipe 102 competes for the bandwidth for the pipe. The pipes 102 and autonomous flows 106 compete for the bandwidth of the system 100. Communications network system 100 can include, for example, 256K autonomous flows 106 and 256 pipes 102.

In accordance with features of the preferred embodiment, improved system performance is enabled with one or more oversubscribed, underutilized pipes 102. The system bandwidth consumed by the pipe 102 is more closely matched to the underutilized bandwidth required by the pipe flows 104.

Figure 2:
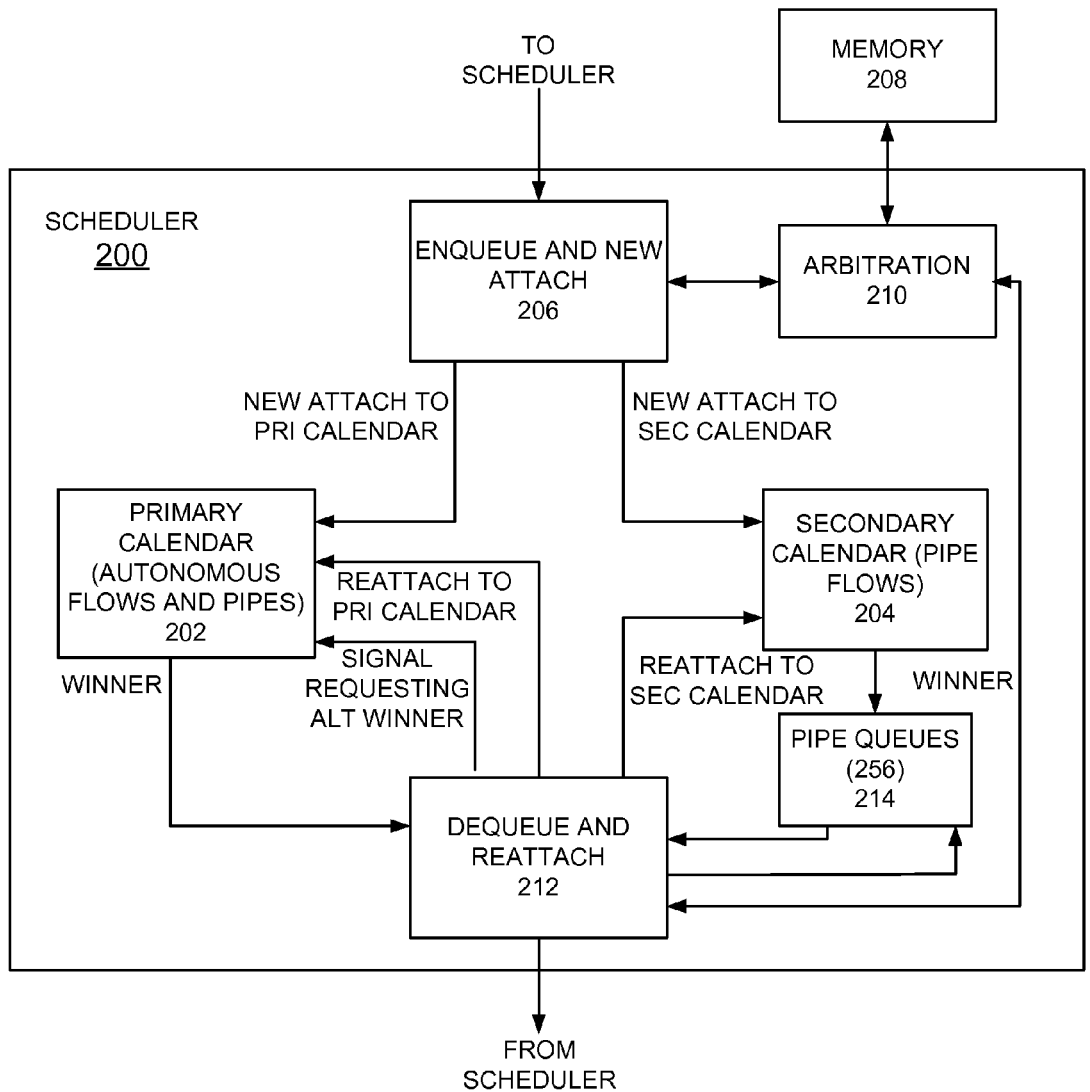
FIG. 2 is a block diagram representation of a hierarchical scheduler for implementing scheduling methods including virtual paths capable of handling network traffic of FIG. 1 in accordance with the preferred embodiment.

Referring to FIG. 2, there is shown an exemplary hierarchical scheduler generally designated by the reference character 200 for implementing scheduling methods for virtual paths with underutilized bandwidth in the communications network system 100 in accordance with the preferred embodiment. Hierarchical scheduler 200 includes a primary calendar 202 for autonomous flows 106 and pipes 102 and a secondary calendar 204 for pipe flows 104. Hierarchical scheduler 200 includes an enqueue and new attach mechanism 206 coupled to the primary calendar 202, the secondary calendar 204, and a memory 208 via an arbitration logic 210. Memory 208 stores connection information or packet identification (ID) containing a number of bytes of frame header information. The enqueue and new attach mechanism 206 accesses memory 208 to find information on a connection or if not attached, then provides a new attach to one or both of the primary calendar 202 and the secondary calendar 204. A dequeue and reattach mechanism 212 processing autonomous flows 106 and pipe flows 104 of pipes 102 is coupled to the primary calendar 202 and the secondary calendar 204, and a pipe queues logic 214. The dequeue and reattach mechanism 212 receives an autonomous flow or pipe winner from the primary calendar 202. The dequeue and reattach mechanism or logic 212 receives a pipe flow winner from the secondary calendar 204 via pipe queues 214. The dequeue and reattach mechanism 212 provides a pipe reattach signal to the primary calendar 202 and a pipe flow reattach signal to the secondary calendar 204. The dequeue and reattach mechanism 212 provides a signal for an alternate winner to the primary calendar 202.

In accordance with features of the preferred embodiment, a simple mechanism is used to adapt the behavior of a pipe 102 to the behavior of its member flows 104. When a pipe 102 wins, the associated pipe queue 214 is examined. If any entry is found, processing continues normally, that is, a cell or frame is sent out for the pipe flow, and both the pipe 102 and the pipe flow 104 are reattached at the appropriate point on the respective calendars 202, 204. However, when the pipe queue is found empty, the pipe 102 is given a "pipe win credit". The pipe 102 is not reattached to the primary calendar 202. Eventually the secondary calendar 204 moves a pipe flow 104 into the pipe queue 214. The pipe queue logic 212 informs the dequeue logic 210 when a pipe flow 104 is placed into a pipe queue that has a pipe win credit. The dequeue logic 210 immediately begins processing that pipe flow 104 without delay. From that point on processing continues normally with a cell or frame sent out for the pipe flow 104, and both the pipe 102 and the pipe flow 104 are reattached at the appropriate point on the respective calendars 202, 204.

Figure 3:
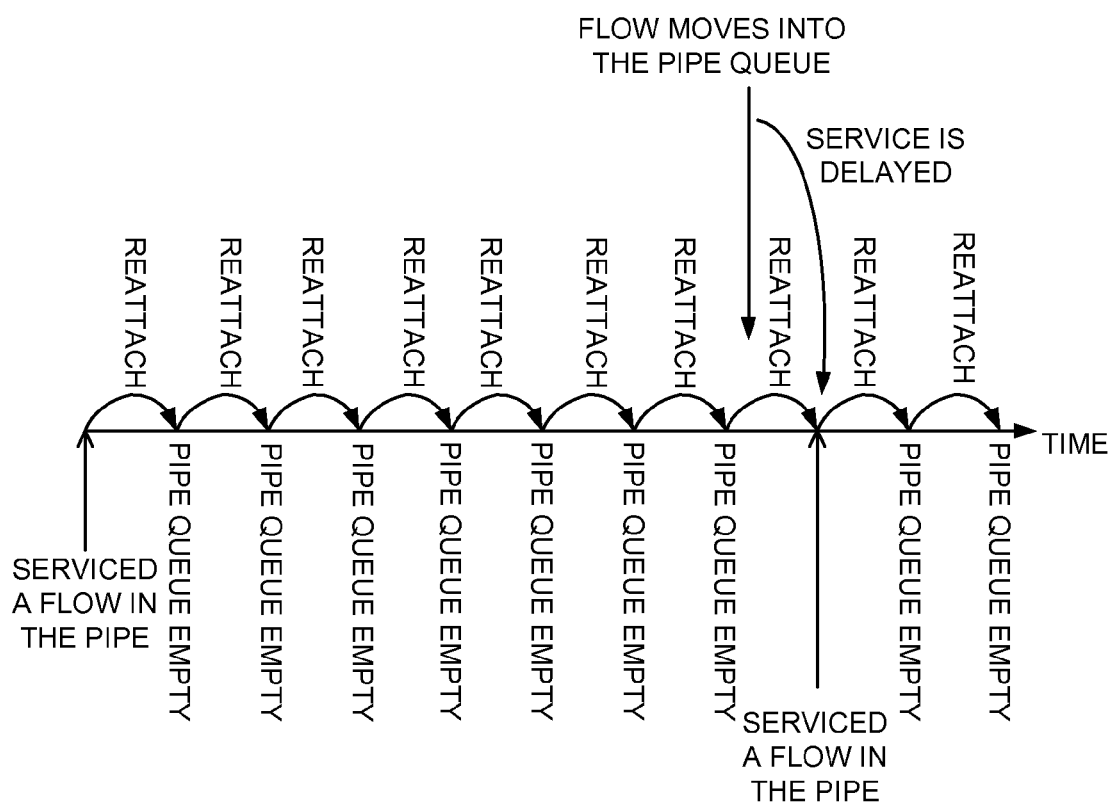
FIG. 3 is a chart illustrating prior art sequential timeline operations of the conventional scheduling arrangements.

Referring to FIG. 3, there is shown prior art sequential timeline operations of the conventional scheduling arrangements. As shown, one pipe is currently using ⅛ of its bandwidth. First a flow in the pipe is serviced and the pipe is reattached. At each of the next seven scheduled time slots, the pipe queue is empty and the pipe is reattached while no useful work is done. Then when a pipe flow moves into the pipe queue, service is delayed until to the next scheduled pipe time slot and then the pipe flow is serviced and the pipe reattached. Operations continue to reattach the pipe with the pipe queue empty. Resources are consumed when the pipe queue is found empty. If many other pipes are doing the same thing, the prior art scheduler will not be able to keep up even though the incoming bandwidth is well below the system maximum.

Figure 4:
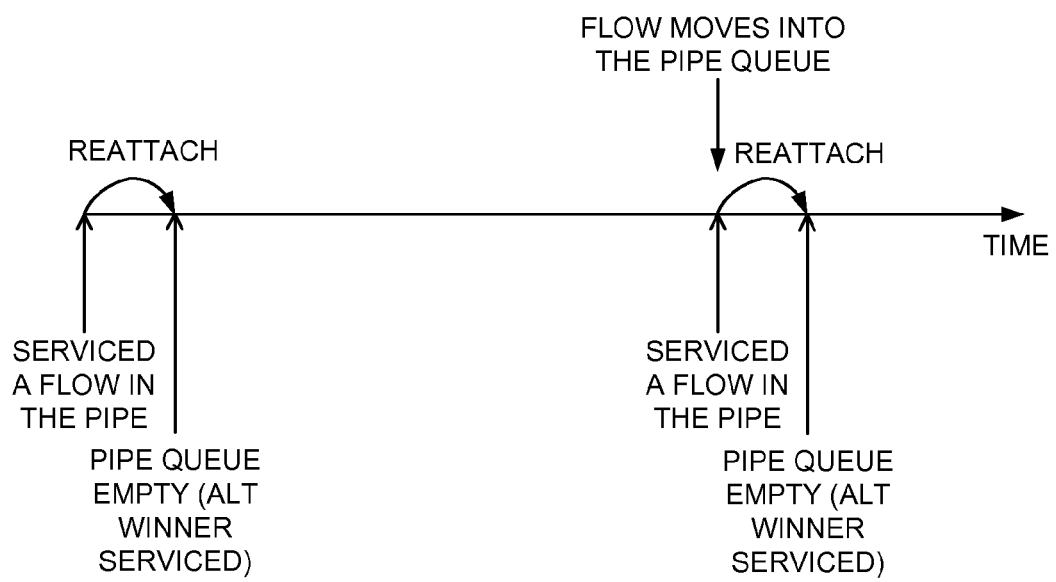
FIGS. 4 and 5 are charts illustrating sequential timeline operations of the hierarchical scheduler for implementing scheduling methods for virtual paths with underutilized bandwidth in accordance with the preferred embodiment.
Figure 5:
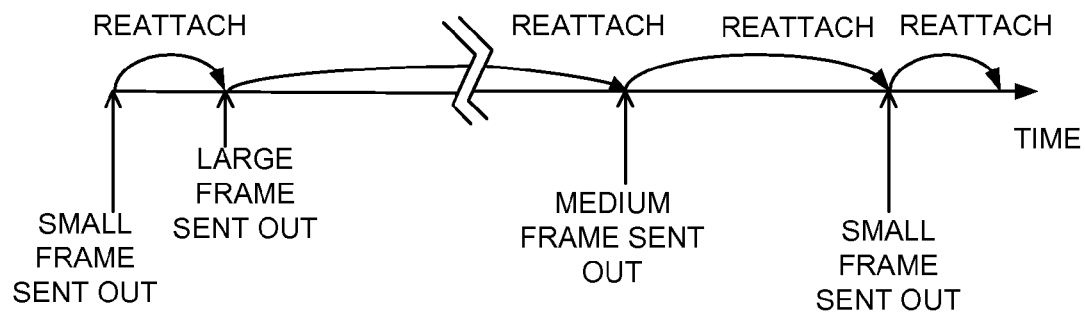

Referring now to FIGS. 4 and 5, there are shown sequential timeline operations of the hierarchical scheduler 200 for implementing scheduling methods for virtual paths with underutilized bandwidth in accordance with the preferred embodiment. In FIG. 4, first a pipe flow 104 in one pipe 102 is serviced and the pipe 102 is reattached. Next when the pipe queue 214 is found empty, an alternate winner is selected from the primary calendar 202 and serviced. The dequeue and reattach mechanism 212 provides the alternate winner signal to the primary calendar 202 and the pipe 102 is not reattached to the primary calendar 202 and the pipe 102 is given the pipe win credit. When the secondary calendar 204 moves a pipe flow 104 into the pipe queues logic 214, the pipe queue logic 212 informs the dequeue and reattach logic 210 that a pipe flow 104 was placed into a pipe queue 214 that has the pipe win credit. The dequeue and reattach logic 210 immediately services that pipe flow 104 and the pipe 102 is reattached to the primary calendar 202. Then when the pipe queue 214 is found empty, the dequeue and reattach mechanism 212 provides the alternate winner signal to the primary calendar 202 and the pipe 102 is not reattached to the primary calendar 202 and the pipe 102 is given the pipe win credit. Scheduler 200 adapts system bandwidth consumed by the pipe 102 to consume only the underutilized bandwidth required by the member pipe flows 104. Scheduler 200 services the pipe flows 104 more timely without the delayed service provided by the prior art arrangements illustrated in FIG. 3.

Referring to FIG. 5, there is shown an exemplary timeline for Internet protocol (IP) or frame transmission scheduling of the hierarchical scheduler 200 in accordance with the preferred embodiment. In the Asynchronous Transfer Mode (ATM), the reattach goes out a fixed amount of time, for example, as illustrate in FIG. 4. In the IP or for frame transmission, the next target transmission time or reattach distance is determined by the current frame size. The reattach distance generally equals a time step multiplied by a frame multiplier corresponding to the frame length. This allows quality of service and mixing of various qualities of service over a single frame link, much in the manner that ATM provides for quality of service. As shown, the reattach distance is proportional to the size of a frame. The reattach distance schedules a large frame further out than a small frame or a medium frame. This is obviously a problem for prior art arrangements if the selected pipe is found empty since there is no frame or frame length on which to base the reattach distance.

Figure 6:
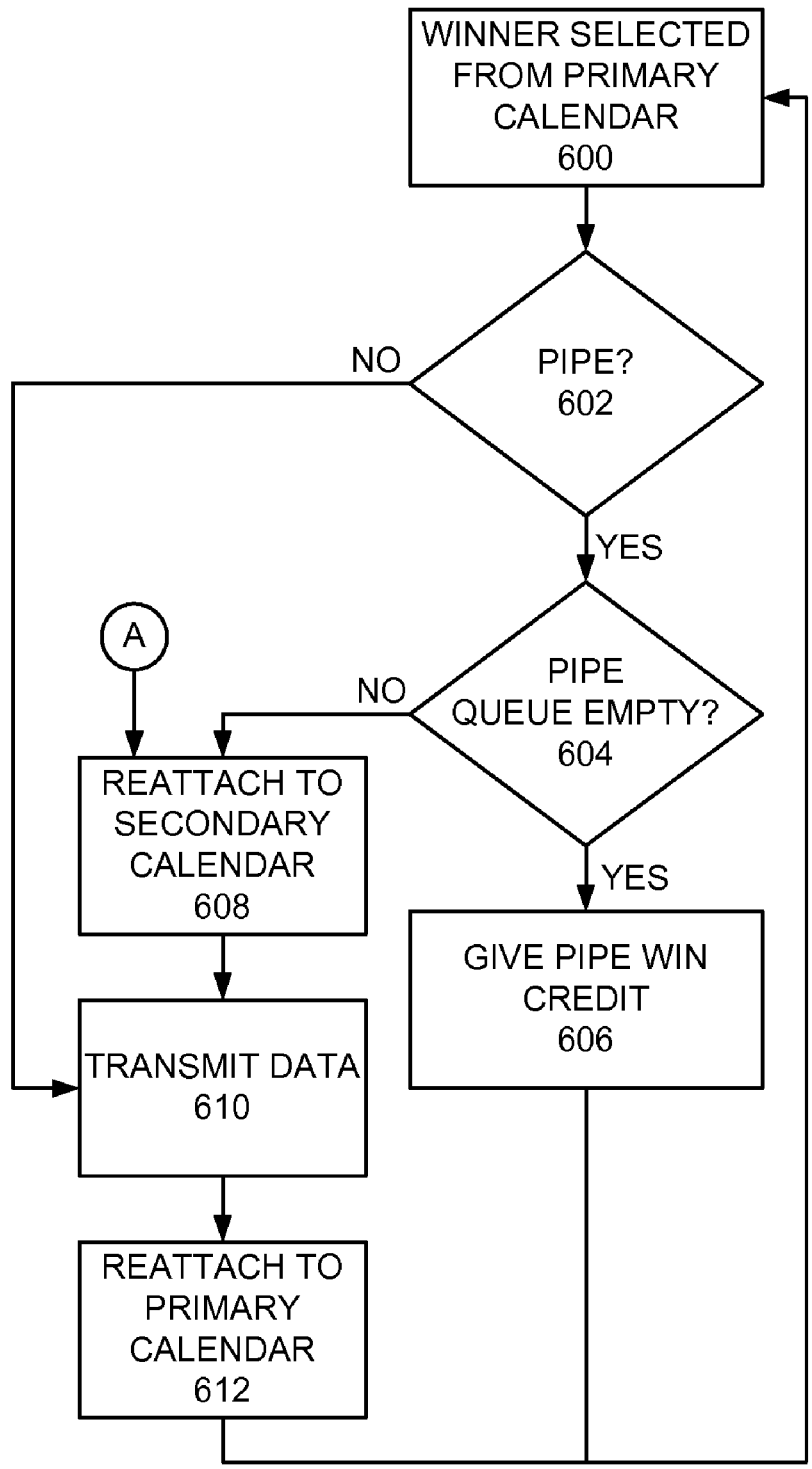
FIGS. 6 and 7 are flow charts illustrating exemplary steps performed by the hierarchical scheduler of FIG. 2 for implementing scheduling methods for virtual paths with underutilized bandwidth in accordance with the preferred embodiment.
Figure 7:
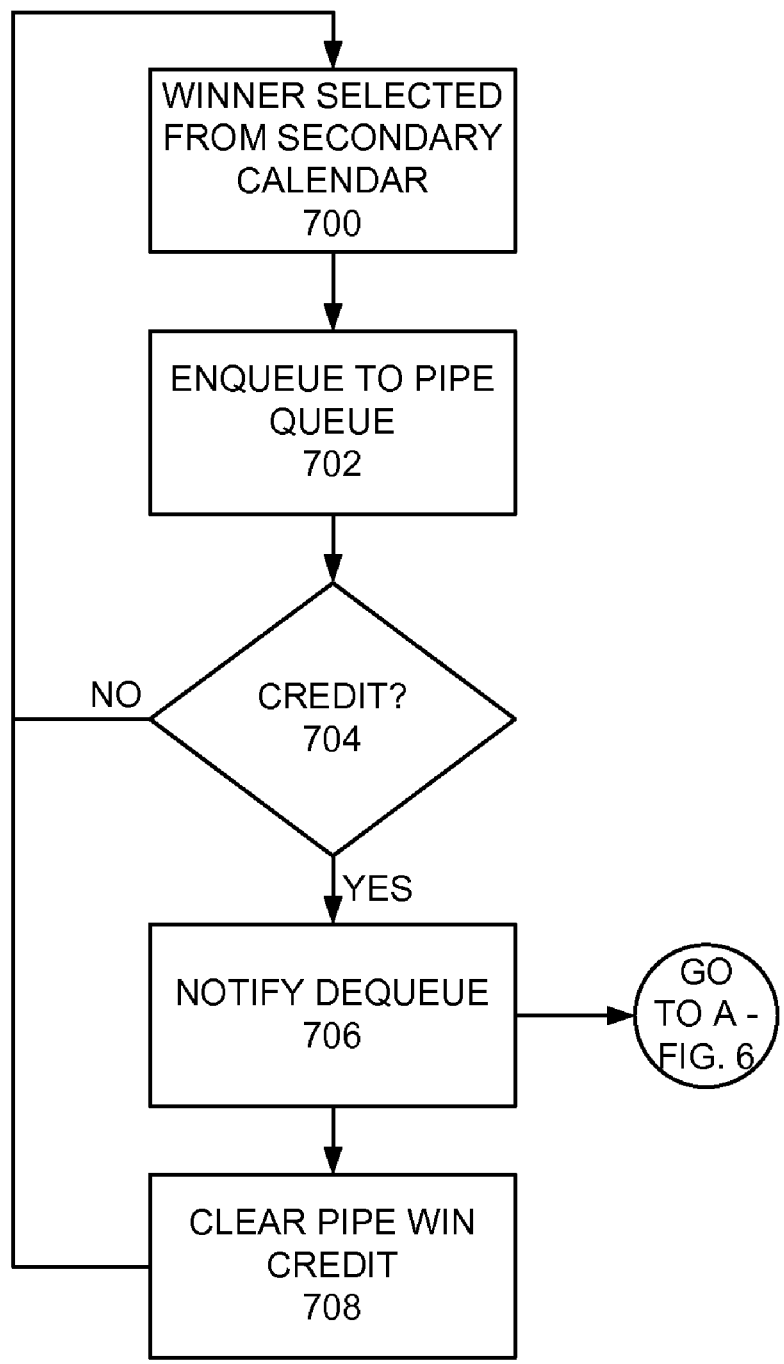

Referring now to FIGS. 6 and 7, there are shown exemplary steps performed by the hierarchical scheduler 200 for implementing scheduling methods for virtual paths with underutilized bandwidth in accordance with the preferred embodiment. In FIG. 6, first a winner is selected from the primary calendar 202 as indicated in a block 600. Checking for a pipe is performed as indicated in a decision block 602. When the selected winner is a pipe, then checking whether the pipe queue is empty is performed as indicated in a decision block 604. When the pipe queue is empty, then the pipe 102 is given a pipe win credit as indicated in a block 606. If the pipe queue is not empty, then the pipe flow is reattached to the secondary calendar 204 as indicated in a block 608. The pipe flow 104 is serviced with data transmitted as indicated in a block 610. When the selected winner is an autonomous flow 106 at decision block 602, then the transmitted data at block 610 is for the autonomous flow 106. Then the pipe 102 or autonomous flow 106 is reattached to the primary calendar 202 as indicated in a block 612. Then the sequential operations return to the beginning at block 600.

In FIG. 7, first a winner is selected from the secondary calendar 204 as indicated in a block 700. The winner pipe flow 104 is enqueued to the pipe queues 214 as indicated in a block 702. Checking for a pipe win credit for the associated pipe 102 is performed as indicated in a decision block 704. When the pipe win credit for the associated pipe 102 is not identified, then the sequential operations return to the beginning at block 700. When the pipe win credit for the associated pipe 102 is identified, then the dequeue and reattach logic 212 is notified as indicated in a block 706. Then the sequential operations continue following entry point A in FIG. 6, and the pipe win credit is cleared as indicated in a block 708. Then the sequential operations return to the beginning at block 700.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods for implementing hierarchical scheduling of virtual paths with underutilized bandwidth of the preferred embodiment with scheduler 200 in the system 100 of FIG. 1.

A sequence of program instructions or a logical assembly of one or more interrelated modules defined by the recorded program means 804, 806, 808, 810, direct the scheduler 200 for implementing hierarchical scheduling of virtual paths with underutilized bandwidth of the preferred embodiment.

While the present invention has been described with reference to the details of the embodiments of the invention shown in the drawing, these details are not intended to limit the scope of the invention as claimed in the appended claims.

What is claimed is:

1. An apparatus for implementing hierarchical scheduling of virtual paths with underutilized bandwidth comprising:
   a scheduler including a first calendar for pipes and autonomous flows;
   said scheduler including a secondary calendar for pipe flows;
   dequeue and reattach logic coupled to said first calendar and said secondary calendar;
   pipe queues logic coupled between said secondary calendar and said dequeue and reattach logic;
   said scheduler identifying a winner of a pipe or an autonomous flow from said first calendar;
   said dequeue and reattach logic responsive to an identified winner pipe, checking said pipe queue logic for an associated pipe flow for said winner pipe; and
   said dequeue and reattach logic responsive to identifying an empty pipe queue for said winner pipe, assigning a pipe win credit to said identified winner pipe without reattaching said identified winner pipe to said first calendar; and
   said scheduler identifying a next winner of a pipe or an autonomous flow from said first calendar, responsive to said pipe win credit being assigned;
   said pipe queues logic, responsive to identifying a pipe flow winner from said secondary calendar, checking for said respective pipe win credit being assigned, and responsive to identifying said respective pipe win credit being assigned, notifying said dequeue and reattach logic and said pipe queues logic clearing said respective pipe win credit;
   said dequeue and reattach logic, responsive to being notified of said pipe flow winner and said respective pipe win credit being assigned, servicing said pipe flow winner substantially without delay; said dequeue and reattach logic transmitting data, reattaching said pipe to said first calendar, and reattaching said associated winner pipe flow to said secondary calendar.

2. The apparatus as recited in claim 1 wherein said dequeue and reattach logic, responsive to identifying an entry for said associated pipe flow for said winner pipe, transmits data, reattaches said winner pipe to said first calendar, and reattaches said associated pipe flow to said secondary calendar.

3. The apparatus as recited in claim 1 wherein said dequeue and reattach logic, responsive to said identified autonomous flow being a winner, transmits data and reattaches said identified autonomous flow to said first calendar.

4. The apparatus as recited in claim 1 wherein said dequeue and reattach logic further identifies a reattach distance for Internet protocol (IP) frame transmission based upon a current frame size.

5. A computer program product for implementing hierarchical scheduling of virtual paths with underutilized bandwidth in a scheduler including a first calendar for pipes and autonomous flows and a secondary calendar for pipe flows, said program product comprising a plurality of scheduler-executable instructions recorded on a computer-readable medium consisting one of a floppy disk, a high capacity read only memory in the form of an optically read compact disk or CD-ROM, and a tape, wherein said instructions, when executed by a scheduler cause the scheduler to perform the steps of:
   identifying a winner of a pipe or an autonomous flow from the first calendar;
   responsive to an identified winner pipe, checking a pipe queue for an associated pipe flow for said winner pipe;
   responsive to identifying an empty pipe queue for said winner pipe, assigning a pipe win credit to said identified winner pipe without reattaching said identified winner pipe to the first calender; and
   identifying a next winner from the first calendar, responsive to said pipe win credit being assigned;
   identifying a pipe flow winner from the secondary calendar, and checking for said respective pipe win credit being assigned to an associated pipe for said identified pipe flow winner;
   servicing said pipe flow winner substantially without delay, responsive to identifying said respective pipe win credit being assigned to said associated pipe for said identified pipe flow winner; and transmitting data for said pipe flow winner, reattaching said pipe flow winner to the secondary calendar, clearing said respective pipe win credit from said associated pipe and reattaching said associated pipe to the first calendar.

6. The computer program product as recited in claim 5 wherein said instructions, when executed by said scheduler, further cause the scheduler to perform the steps of transmitting data and reattaching said winner pipe to the first calendar and said associated pipe flow to the secondary calendar, responsive to identifying an entry for said associated pipe flow for said winner pipe.

7. The computer program product as recited in claim 5 wherein said instructions, when executed by said scheduler, further cause the scheduler to perform the steps of transmitting data and reattaching said identified autonomous flow to the first calendar, responsive to an identified autonomous flow being a winner.

* * * * *